(12) United States Patent
Inagaki et al.

(10) Patent No.: US 11,645,396 B2
(45) Date of Patent: *May 9, 2023

(54) CYBERSECURITY VULNERABILITY MANAGEMENT BASED ON APPLICATION RANK AND NETWORK LOCATION

(71) Applicant: JPMorgan Chase Bank, N.A., New York, NY (US)

(72) Inventors: Bryan S. Inagaki, West Grove, PA (US); Martin Dawson, Essex (GB); Andrew Graham, Dorset (GB); Ramiro Rodney Murgueytio, Media, PA (US); David J. Robinson, Summit, NJ (US); Ajay D. Vachhani, Parsippany, NJ (US); Travis Washburn, Chestnut Hill Cove, MD (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 118 days.

This patent is subject to a terminal disclaimer.

(21) Appl. No.: 17/395,906

(22) Filed: Aug. 6, 2021

(65) Prior Publication Data
US 2021/0374250 A1    Dec. 2, 2021

Related U.S. Application Data

(63) Continuation of application No. 16/445,732, filed on Jun. 19, 2019, now Pat. No. 11,120,139, which is a
(Continued)

(51) Int. Cl.
*H04L 29/06*    (2006.01)
*H04L 29/08*    (2006.01)
(Continued)

(52) U.S. Cl.
CPC ........ *G06F 21/577* (2013.01); *G06F 3/04817* (2013.01); *G06Q 10/0635* (2013.01); *H04L 63/1433* (2013.01); *G06F 2221/2111* (2013.01)

(58) Field of Classification Search
CPC ............... G06F 21/577; G06F 3/04817; G06F 2221/2111; H04L 63/1433
(Continued)

(56) References Cited

U.S. PATENT DOCUMENTS 8,136,163 B2 * 3/2012 Birt ...................... G06F 11/008
                                                      726/25
8,918,883 B1  12/2014 Boyle et al.
(Continued)

OTHER PUBLICATIONS

Official communication received in Chinese Patent Application No. 201780054860.5, dated Nov. 23, 2022, with an English translation thereof.
(Continued)

*Primary Examiner* — Haresh N Patel
(74) *Attorney, Agent, or Firm* — Greenblum & Bernstein, P.L.C.

(57) ABSTRACT

A method and system are provided for managing cybersecurity vulnerabilities of resources within at least one network. The method includes collecting data including application risk rank and network location. The method further includes determining a vulnerability score for vulnerabilities of the resources and determining severity score based on the application risk rank and network location. The method additionally includes integrating the vulnerability score and the severity score to create a two-dimensional risk ranking.

20 Claims, 8 Drawing Sheets

Related U.S. Application Data continuation of application No. 15/659,744, filed on Jul. 26, 2017, now Pat. No. 10,372,915.

(60) Provisional application No. 62/368,230, filed on Jul. 29, 2016.

(51) Int. Cl.
*G06F 21/57* (2013.01)
*G06F 3/04817* (2022.01)
*G06Q 10/0635* (2023.01)
*H04L 9/40* (2022.01)

(58) Field of Classification Search
USPC .......................................................... 726/25
See application file for complete search history.

(56) References Cited

U.S. PATENT DOCUMENTS

| | | | |
|---|---|---|---|
| 8,984,643 B1 | 3/2015 | Krisher et al. | |
| 9,294,498 B1 * | 3/2016 | Yampolskiy | H04L 61/5076 |
| 9,648,036 B2 * | 5/2017 | Seiver | G06F 21/577 |
| 9,992,230 B1 * | 6/2018 | Haverty | H04L 41/12 |
| 10,009,240 B2 * | 6/2018 | Rao | H04L 67/1001 |
| 10,372,915 B2 * | 8/2019 | Inagaki | G06F 3/04817 |
| 10,657,262 B1 * | 5/2020 | Cui | G06F 21/54 |
| 11,120,139 B2 * | 9/2021 | Inagaki | G06F 21/577 |
| 2005/0283834 A1 * | 12/2005 | Hall | G06F 21/577 |
| | | | 713/188 |
| 2006/0195905 A1 | 8/2006 | Fudge | |
| 2009/0007269 A1 * | 1/2009 | Bianco | H04L 63/1433 |
| | | | 726/25 |
| 2009/0077666 A1 * | 3/2009 | Chen | G06F 21/577 |
| | | | 726/25 |
| 2010/0043074 A1 * | 2/2010 | Scates | G06F 21/577 |
| | | | 726/25 |
| 2010/0275263 A1 | 10/2010 | Bennett et al. | |
| 2012/0185945 A1 | 7/2012 | Andres et al. | |
| 2013/0191919 A1 * | 7/2013 | Basavapatna | H04L 63/20 |
| | | | 726/25 |
| 2013/0247205 A1 * | 9/2013 | Schrecker | G06F 21/577 |
| | | | 726/25 |
| 2014/0007244 A1 * | 1/2014 | Martin | G06F 21/577 |
| | | | 726/25 |
| 2014/0137257 A1 * | 5/2014 | Martinez | H04L 63/1433 |
| | | | 726/25 |
| 2014/0215630 A1 * | 7/2014 | Raz | H04L 63/1433 |
| | | | 726/25 |
| 2014/0282977 A1 * | 9/2014 | Madhu | H04W 12/12 |
| | | | 726/7 |
| 2014/0344937 A1 * | 11/2014 | Sabin | H04L 63/1433 |
| | | | 726/25 |
| 2015/0019658 A1 * | 1/2015 | Barrera | H04L 51/56 |
| | | | 709/206 |
| 2016/0248794 A1 * | 8/2016 | Cam | H04L 63/1433 |
| 2016/0300065 A1 * | 10/2016 | Bang | G06F 21/577 |
| 2016/0330228 A1 * | 11/2016 | Knapp | G06F 21/57 |
| 2016/0379326 A1 * | 12/2016 | Chan-Gove | H04L 63/107 |
| | | | 705/325 |
| 2017/0013014 A1 * | 1/2017 | Foster | H04L 67/02 |
| 2017/0046519 A1 * | 2/2017 | Cam | G06F 21/577 |
| 2017/0098086 A1 * | 4/2017 | Hoernecke | G06Q 10/10 |
| 2017/0104779 A1 * | 4/2017 | Middleman | G06F 21/577 |
| 2017/0289187 A1 * | 10/2017 | Noel | G06F 16/9024 |
| 2017/0346824 A1 * | 11/2017 | Mahabir | H04L 63/1433 |
| 2017/0353482 A1 * | 12/2017 | Sommer | H04L 63/1433 |
| 2018/0027006 A1 * | 1/2018 | Zimmermann | G06F 21/6218 |
| | | | 726/11 |
| 2018/0032736 A1 * | 2/2018 | Inagaki | G06F 21/577 |
| 2018/0107821 A1 * | 4/2018 | Eshkenazi | G06F 21/52 |

OTHER PUBLICATIONS

PCT International Search Report dated Oct. 12, 2017.
Official communication received in European Patent Application No. 17835387.6, dated Nov. 25, 2021.

* cited by examiner

US 11,645,396 B2

CYBERSECURITY VULNERABILITY MANAGEMENT BASED ON APPLICATION RANK AND NETWORK LOCATION

CROSS REFERENCE TO RELATED APPLICATIONS

This is a continuation of U.S. patent application Ser. No. 16/445,732, filed Jun. 19, 2019, now U.S. Pat. No. 11,120,139, issued Sep. 14, 2021, which is a continuation application of U.S. patent application Ser. No. 15/659,744, filed Jul. 26, 2017, now U.S. Pat. No. 10,372,915, issued Aug. 6, 2019, which claims the benefit of U.S. Provisional Application No. 62/368,230, filed on Jul. 29, 2016. The entire disclosure of each of the above-identified applications is incorporated herein by reference in its entirety.

TECHNICAL FIELD

Embodiments of the invention are related generally to systems and methods for identifying and managing vulnerabilities of resources connected over one or more networks.

BACKGROUND OF THE INVENTION

Computer networks and systems have become vital components for management of businesses worldwide. Unfortunately, computer networks and systems may be vulnerable to various types of attacks that have varying levels of impact. Because the vulnerabilities of computer networks and systems can be extensive and because the impact of these vulnerabilities varies widely, a need has arisen for scoring the vulnerabilities in order to allow businesses to assess priorities and resolve the vulnerabilities in the most efficient manner.

Accordingly, a scoring system was developed known as the Common Vulnerability Scoring System (CVSS). The CVSS is a free and open industry standard for assessing the severity of computer system security vulnerabilities. CVSS attempts to assign scores to vulnerabilities, allowing responders to prioritize responses and resources according to threat. Scores are calculated based on a formula that depends on several metrics that approximate ease of exploit and the impact of exploit. CVSS is divided into three scores that are combined when possible to create an overall score with a value from 0 to 10. Multiple versions of CVSS have been developed. Based on the CVSS version two framework, a commonly used currently existing vulnerability scoring model includes a rank-ordered, five-point scale. A purpose of the system is to provide repeatable accurate measurement of vulnerabilities and the ability for users to view underlying vulnerability characteristics that generated the scores.

While the ranking system is simple and easily understood, the five-point scale creates very broad categories of vulnerabilities and does not provide a sufficient level of detail for effective prioritization of remediation actions. Larger organizations have networks with hundreds of thousands of servers and workstations. A critical vulnerability that impacts potentially tens of thousands of servers at once requires additional differentiation factors beyond a simple five-point scale.

The inability to prioritize remediation can lead to vulnerabilities lingering within network environments longer than necessary, delays in remediation timelines due to lack of guidance to the Lines of Business (LOBs), and lack of confidence in the ability for the cybersecurity personnel to effectively manage vulnerabilities throughout the network environments.

Additionally, the currently existing model fails to take an adequate number of risk measures into account. There are a variety of risks associated with any potential vulnerability, including operational, financial, and reputational. These risk measures are not part of the current model. Accordingly, remediation of vulnerabilities is done without regard for underlying risk measures. While there are environmental score metrics that can be included as part of the CVSS framework, even when fully utilized the framework does not take into account risk outside the realm of information technology such as financial loss if an application is not able to properly function.

FIG. 8 illustrates the shortcomings of existing models as described above. While existing models are able to categorize vulnerabilities as critical, severe, high, medium, or low, the existing model suffers from numerous deficiencies including: (1) breadth of categories; (2) lack of prioritization; (3) lingering vulnerabilities; (4) delayed remediation; and (5) loss in cybersecurity confidence.

In order to address the deficiencies of currently available scoring methods, a system is needed that includes a greater number of vulnerability rankings that would allow for creation of reasonable and achievable service level agreements. Furthermore, a system is needed that facilitates inclusion of additional risk factors into the scoring model including, for example, application criticality, potential business/operational impact, and network location. Furthermore, the system should take into account changes in regulations, policies, risk measurements, or industry standards and should be easily integrated with existing automated scoring systems. Additionally, the system should include a visualization layer that provides for generation of prioritized remediation lists. Furthermore, the system should interface with remediation resources so that remediation can be expedited and automatically implemented.

SUMMARY OF THE INVENTION

In one aspect, the invention includes a computer-implemented method for managing cybersecurity vulnerabilities of resources within at least one network. The method includes collecting, by at least one processor over a network, data pertaining to multiple network resources, the data including application risk rank and network location. The method additionally includes utilizing the at least one processor to manage cybersecurity vulnerabilities within the network by performing multiple operations. The operations include determining vulnerability scores corresponding to vulnerabilities of the network resources and determining severity scores for the network resources based on the application risk rank and network location of the network resources. The operations additionally include integrating each vulnerability score and a corresponding severity score for the network resources to create a two-dimensional risk ranking and prioritizing remediation of the vulnerabilities within the network based on the two-dimensional risk ranking.

In another aspect of the invention, a cybersecurity vulnerability management system is provided for operating within at least one network. The system includes at least one input processing engine for collecting data including application risk rank and network location and at least one computer memory storing instructions. The system additionally includes at least one computer processor accessing the stored instructions and the collecting data for performing multiple steps. The steps include determining vulnerability scores corresponding to vulnerabilities of network resources and determining severity scores for the network resources based on the application risk rank and network location of the network resources. The steps additionally include integrating each vulnerability score and a corresponding severity score to create a two-dimensional risk ranking and prioritizing remediation of the vulnerabilities within the network based on the two dimensional risk ranking.

In further aspects of the invention, the system calculates a vulnerability index as a weighted sum of vulnerabilities associated with an application or host. The system additionally schedules remediation of vulnerabilities based on the risk ranking. Additionally, a non-transitory computer-readable medium is provided that, when executed by a computer processor, performs the steps associated with the method described above.

BRIEF DESCRIPTION OF THE DRAWINGS

Embodiments of the present invention are described in detail below with reference to the attached drawings figures, wherein.

DETAILED DESCRIPTION OF PREFERRED EMBODIMENTS

Embodiments of the present invention are directed to a system and method for assessing the vulnerability of computer system and network security and for determining the severity of the vulnerabilities in order to prioritize and facilitate remediation.

Figure 1:
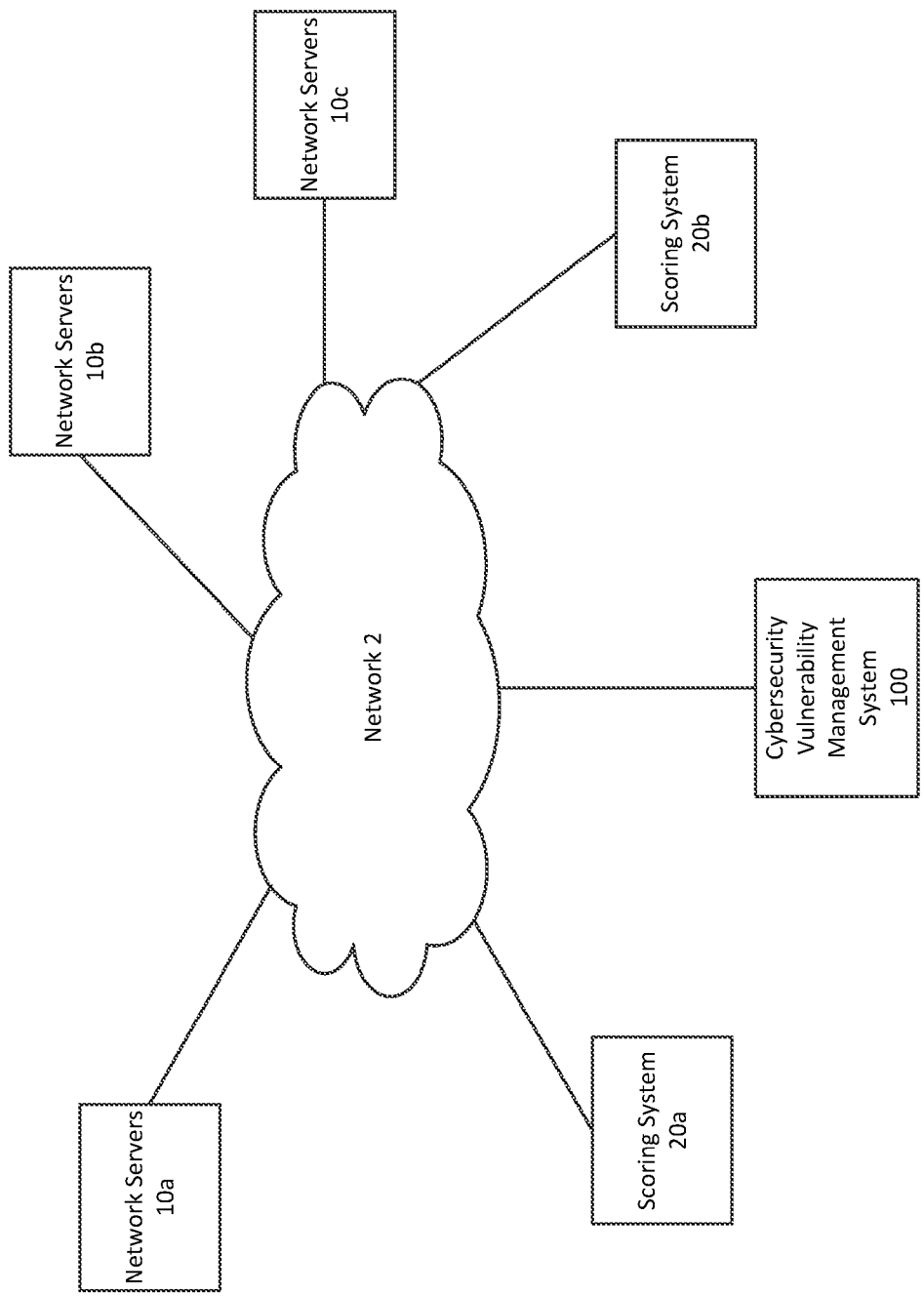
FIG. 1 is a block diagram illustrating an operating environment for a cybersecurity vulnerability management system in accordance with an embodiment of the invention.

FIG. 1 is a block diagram illustrating an operating environment for a cybersecurity vulnerability management system in accordance with an embodiment of the invention. Multiple network servers and other network resources 10a, 10b, and 10c may be connected over one or more networks 2 with scoring systems 20a and 20h and a cybersecurity vulnerability management system 100. While a limited number of network resources 10a, 10b, and 10c are shown, embodiments of the invention include many more network resources, e.g., hundreds of thousands of network resources.

The network 2 may include a wired or wireless local area network (LAN) and a wide area network (WAN), wireless personal area network (PAN) and other types of networks. Although only one network 2 is shown, multiple networks may function within the displayed environment. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths. Many networks may be included in order to connect system resources with one another and with external resources.

The multiple network servers 10a, 10b, and 10c and other system resources may include various types of computing systems and applications stored thereon. Other structures and resources may also be connected over the networks 2. Thus the network servers 10 may include at least one processor and one or more applications executed on the processor capable of communicating with the cybersecurity vulnerability management system 100. The network servers 10 may include browsers for accessing information from the cybersecurity and vulnerability management system 100 and software applications provided by other connected systems that offer functionality over the Internet or any other network.

The scoring systems 20 may include pre-existing systems such as the CVSS system described above. Other scoring systems may also operate within the networks. Although the scoring systems 20a, 20b are shown separately, they may alternatively be incorporated within the cybersecurity vulnerability management system 100.

Figure 2:
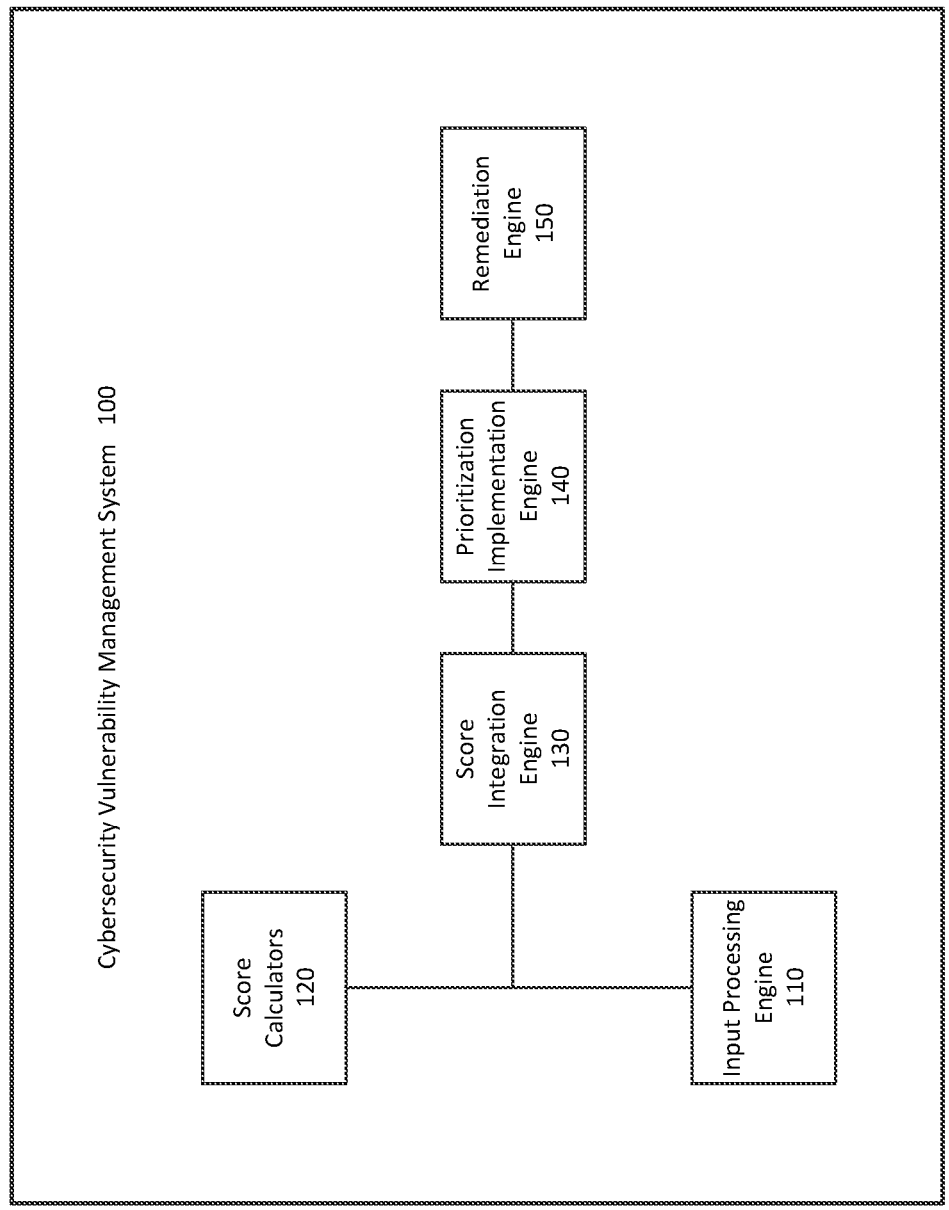
FIG. 2 is a block diagram illustrating components of the cybersecurity vulnerability management system in accordance with embodiments of the invention.

The cybersecurity vulnerability management system 100 may be included in a host system or platform at a larger firm or institution. Accordingly, the host system may include many systems and components that are not shown. The cybersecurity vulnerability management system 100 is further illustrated in FIG. 2. Various components include score calculators 120, an input processing engine 110, a score integration engine 130, a prioritization implementation engine 140, and a remediation engine 150. All of the displayed components either include at least one processor or include executable instructions executed by at least one processor. Software components may be stored in a non-transitory computer memory.

The input processing engine 110 may collect data from the network resources including the network servers 10 and the scoring systems 20. For example, as will be further discussed below, the system requires collection of data regarding vulnerabilities, applications and network locations in order to determine a severity score. This data may be collected from a network resource 10 such as a database connected over the network or by issuing a query to the network resources 10. In embodiments of the invention, the cybersecurity vulnerability management system 100 may be programmed to automatically receive data feeds from the network resources 10. For example, the network resources 10 may self-report their network locations and applications running to the cybersecurity vulnerability management system 100. The stored data may be structured, semi-structured, or unstructured. The data storage areas may include file systems and databases for storing large amounts of data. For example, the data storage areas may include HP 3PAR StoreServ® Storage systems. Those of ordinary skill in the art will appreciate that other computer storage systems for storing large amounts of data may be implemented. Data stored in the data storage areas may be managed and communicated with an Object-Relational Database Management System, such as Postgre® or other Object-Relational Database Management Systems that are known in the art. Multiple data storage areas may have different structures and store different types of data. For example, unstructured data may be stored separately from cleansed and structured data.

Further, the input processing engine 110 may collect the CVSS score from existing scoring systems as shown in FIG. 1 to enable utilization of the score for additional procedures as will further be explained below with respect to FIGS. 4 and 5.

The score calculators 120 may include both a vulnerability score calculator, a severity score calculator, and a vulnerability index calculator. However, additional score calculators may also be included. The score calculators 120 are configured to automatically calculate scores based on collected data without user intervention.

The score integration engine 130 may operate to integrate the vulnerability score and the severity score and to present the scores and the vulnerability index in a manner enabling visualization and characterization of resource vulnerabilities for resources connected over the network. The integration may utilize a visualization layer to provide an enhanced view of vulnerabilities to users, such as system administrators and security leads within each line of business within organizations utilizing the cybersecurity vulnerability management system 100.

The prioritization implementation engine 140 determines, based on the integrated scores, a priority for remediating system vulnerabilities. The prioritization implementation engine 140 may cause reports to be generated recommending remediation and/or automatically expedite remediation based on the integrated score provided by the score integration engine 130. The prioritization implementation engine 140 may, for example, be responsive to requests from users through a user interface to generate a prioritized remediation list. Alternatively or additionally, the prioritization implementation engine 140 may deliver instructions to the one or more remediation engines 150, located within the cybersecurity vulnerability management system 100 or in another location. The instructions may provide a prioritized list of vulnerabilities requiring immediate correction and further may include recommended vulnerabilities for correction with lower priority. The remediation engine 150 may match the vulnerability to a known patch and automatically apply the patch to correct the vulnerability.

Figure 3:
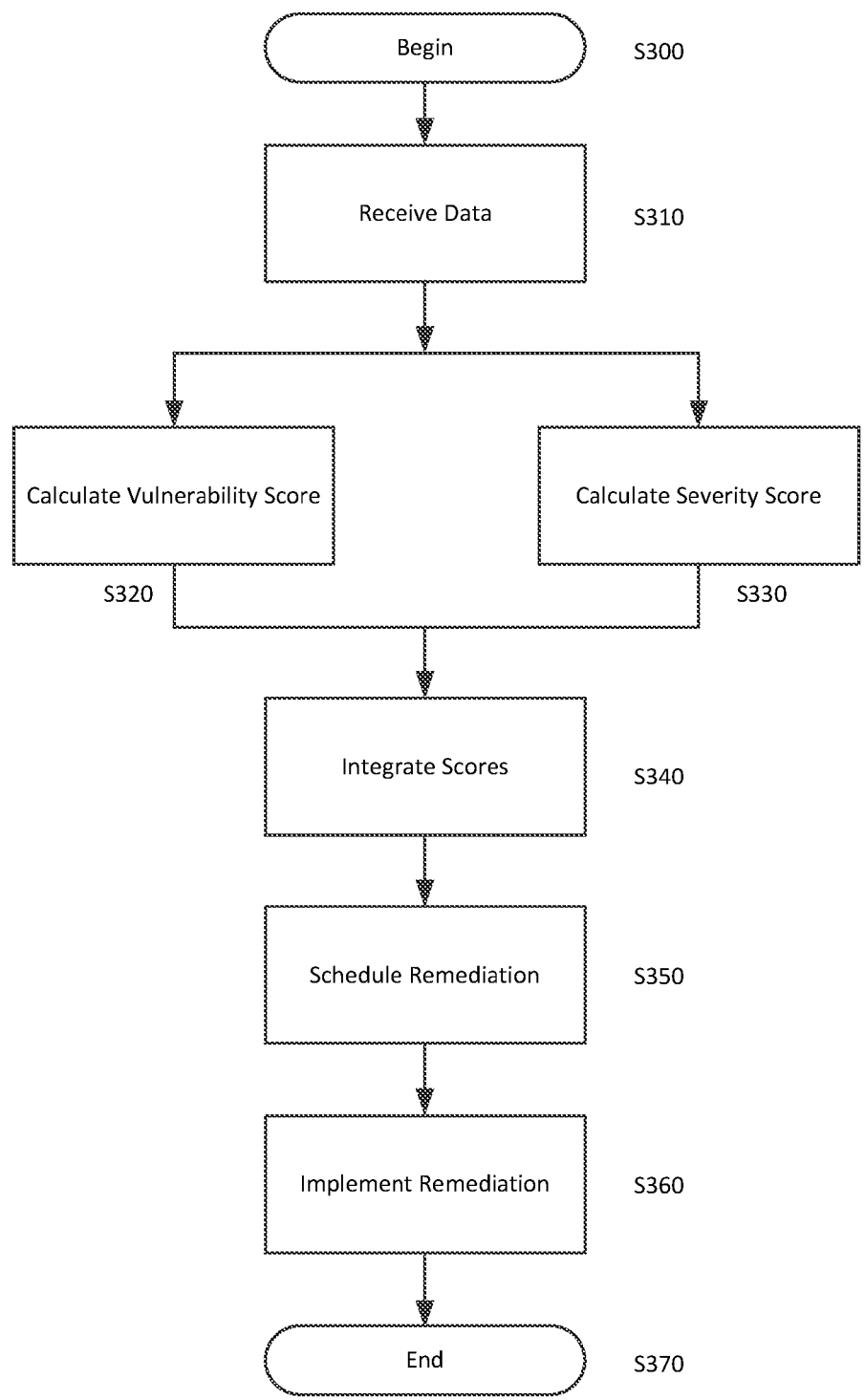
FIG. 3 is a flow chart illustrating operation of the cybersecurity vulnerability management system in accordance with an embodiment of the invention.

FIG. 3 is a flow chart illustrating operation of the cybersecurity vulnerability management system 100 in accordance with an embodiment of the invention. The process begins in S300 and the cybersecurity vulnerability management system receives data in S310. As previously set forth, the received data may include scores calculated by external calculators, such as e.g., a CVSS base score and optionally a CVSS temporal score. The received data may also include a network location of each host and applications running on each network host. The data may be auto-fed periodically at regular intervals, or alternatively, the data may be extracted from databases or network resources upon request.

Based on the received data, the system calculates a vulnerability score at S320 and a severity score at S330. The system then integrates these scores at S340. The calculation and integration of scores are further described below with respect to FIGS. 4-6. The system schedules a remediation in S350. Scheduling of remediation at S350 may involve utilizing the calculated scores to create a prioritized remediation list. The option to generate a remediation list is preferably provided on a user interface in a manner enabling "one-click" generation of the remediation list. In further embodiments of the invention, scheduling remediation includes sending the list to the remediation engine 150 and allowing the remediation to select and apply a patch to correct the vulnerabilities at S360. The process ends in S370. The process may execute upon request or on a regularly scheduled basis, such as for example, daily, weekly, or monthly.

Figure 4:
FIG. 4 is a diagram illustrating a scoring method in accordance with an embodiment of the invention.

FIG. 4 is a diagram illustrating a scoring method 400 in accordance with an embodiment of the invention. The scoring method 400 includes a vulnerability score calculation 410 and a severity score calculation 420. In embodiments of the invention, the vulnerability score 410 is calculated by adding the CVSS base score 412 to a CVSS temporal score 414 (when available) to finalize vulnerability level scoring at 416. The CVSS base score captures characteristics of a vulnerability that are constant across time and environment. Each vulnerability in the target environment receives a CVSS base score. The CVSS temporal score captures details about the vulnerability that may change over time, such as the availability of exploit code. The CVSS base score and temporal score may be provided in data feeds from external scoring systems, or alternatively, may be calculated within the cybersecurity vulnerability management system 100.

The severity score 420 is calculated by determining application cyber risk 422 and network location 426 and adding the two quantities to achieve asset level scoring 428. The component measures of application cyber risk may include various elements of business, operation and data risk. The network location is then taken into account based on the tiered network model, with Tier 1 carrying the highest risk and Tier 3 the least. For example, Tier 1 may include demilitarized zone "DMZ" and external connectivity outside the firm network. Tier 2 may include intermediate tiers, and Tier 3 may include internal networks that do not connect with external systems.

An example of the formation of the severity score is illustrated in greater detail below. Equation (1) provides the formula for calculation of a total severity weight. TABLE 1 below illustrates the correlation of severity weights with a severity score.

$$\text{Risk Rank Weight} + \text{Network Location Weight} = \text{Total Severity Weight} \quad (1)$$

TABLE 1

| Application Risk Rank | Weight | Network Location | Weight |
|---|---|---|---|
| Critical | 5 | Tier 1 | 5 |
| High | 4 | Tier 2 | 4 |
| Medium | 2 | Tier 3 | 2 |
| Low | 1 | | |

| Total Weight | Severity Score |
|---|---|
| 10 | 1 |
| 9 | 2 |
| 7-8 | 3 |
| 5-6 | 4 |
| 0-4 | 5 |

As illustrated above in Table 1 above, each application risk rank is assigned a weight. Each application risk rank includes multiple component measures in order to combine elements of business, operational, and data risk. In the displayed embodiment, critical risk ranks are assigned a weight of "5". High risk ranks are assigned a weight of "4".

Medium risk ranks are assigned a weight of "2" and low risk ranks are assigned a weight of "1". Network locations are also assigned a weight. Tier 1 locations, which are considered the riskiest locations are assigned a weight of "5". Tier 2 locations are assigned a weight of "4" and Tier 3 locations are assigned a weight of "2". The system then sums the risk rank weight and the network location weight to obtain a total weight for the vulnerabilities of each system resource. The total weight is assigned to a severity score. In the displayed embodiment, a total weight of "10" is assigned a severity score of "1". A total weight of "9" is assigned a severity score of "2". For less severe vulnerability, ranges of weights may be assigned a single severity score. For example, a weight of "7" or "8" receives a severity score of "3" and a weight of "5" or "6" receives a severity score of "4". Weights between "0" and "4" are assigned a severity score of "5".

Figure 5B:
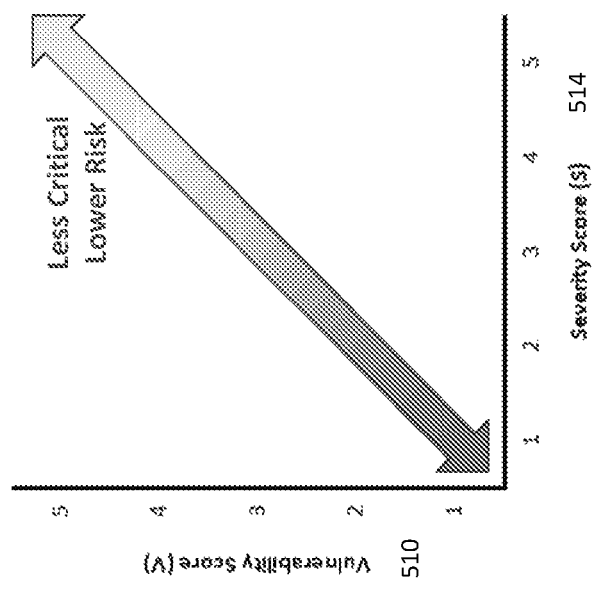
FIGS. 5A and 5B are charts illustrating integration of scores in accordance with embodiments of the invention.
Figure 5A:
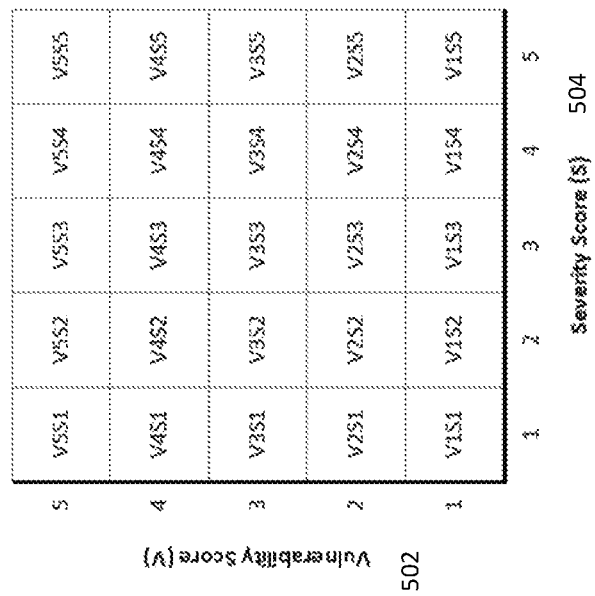

FIGS. 5A and 5B are charts illustrating integration of scores in accordance with embodiments of the invention. In FIG. 5A, vulnerability scores are shown along a y axis 502 and severity scores are shown along the x axis 504. Thus, when the V and S scores are combined, a two-dimensional risk ranking with twenty five discrete ranks is created as shown in the individual cells of the matrix of FIG. 5A. The displayed model is applied at the host level. Thus, a separate score is generated for each impacted host. In order to account for hosts with multiple applications, the application associated with the host having the highest application risk ranking associated with the host may be used when computing the severity score.

FIG. 5B illustrates the criticality of the vulnerabilities based on the displayed ranks, with the most critical risk being located at the origin between x axis 510 and y axis 514. A vulnerability score of "1" combined with a severity score of "1" indicates that the particular network resource has both a high vulnerability and a high severity. Thus, these hosts will receive a high priority on the generated remediation list. Conversely, hosts having lower risk, for example, V5S5 scores, will receive a lower priority on any generated remediation list.

Figure 6:
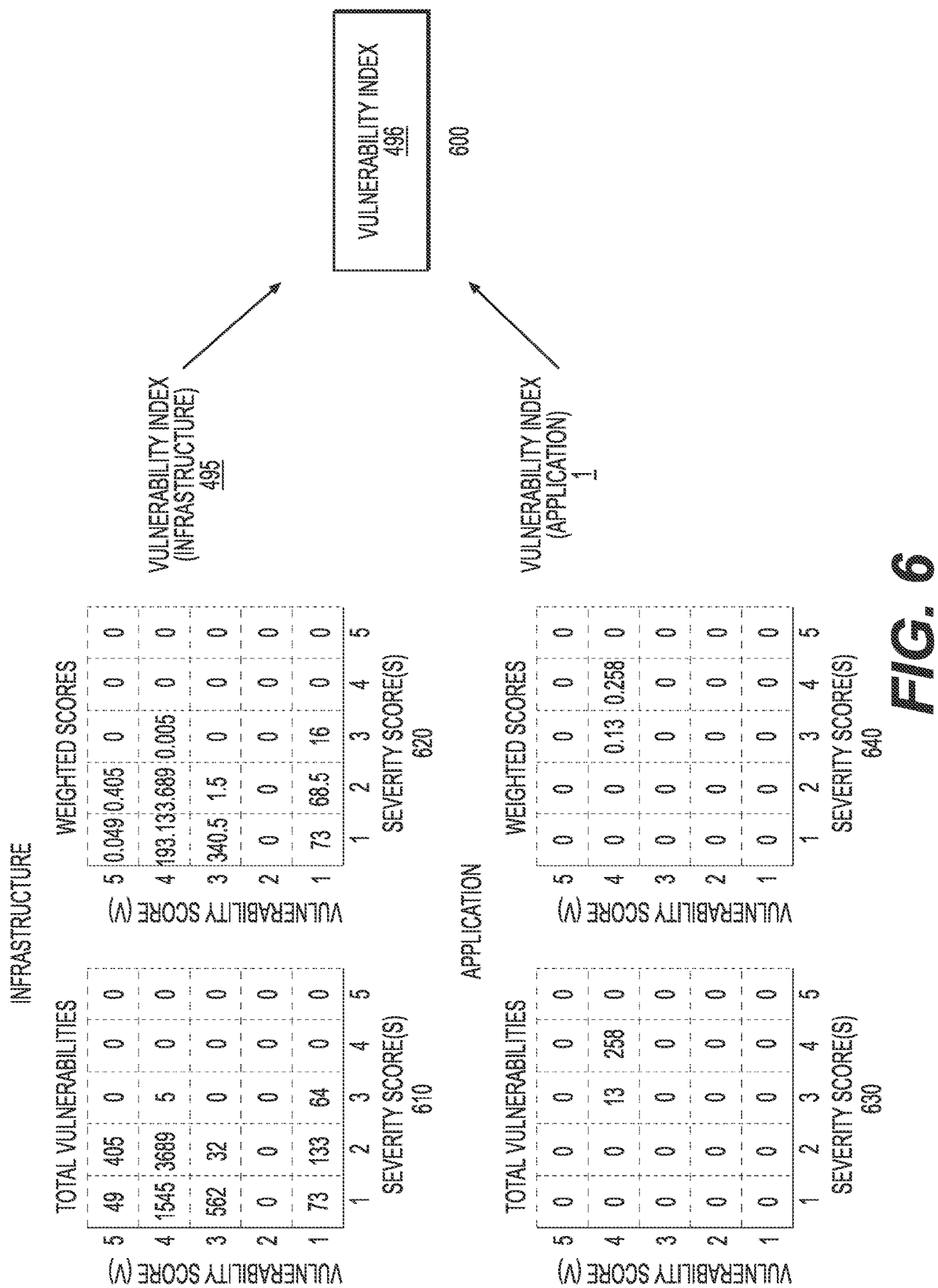
FIG. 6 is a flow diagram illustrating creation of a vulnerability index in accordance with embodiments of the invention.

FIG. 6 is a flow diagram illustrating creation of a vulnerability index (VI) in accordance with embodiments of the invention. The VI is a weighted summation of all vulnerabilities associated with an application or host, and the single index number functions as a measure of the scale of existing vulnerability exposure. The measure also provides a means to directly compare the vulnerability exposure of one application versus another. The summation is created based on the following formula:

$$(\#V1S1 \times V1S1 \text{ Weight}) + (\#V1S2 \times V1S2 \text{ Weight}) + \ldots + (\#V5S5 \times V5S5 \text{ Weight}) \qquad (2)$$

Chart 610 illustrates total vulnerabilities and chart 620 illustrates weighted scores for an infrastructure. Chart 630 illustrates the total vulnerabilities and chart 640 illustrates the weighted scores for an application. The index for the infrastructure and the index for the application are calculated in accordance with the formula as set forth above and the quantities are added to arrive at the vulnerability index.

Thus, the vulnerability index is a weighted summation capable of providing a measure of overall risk exposure. The ability to provide a single integer allows for direct comparisons between vulnerabilities of infrastructures or between vulnerabilities of applications. The breakdown between infrastructure and application also allows determination, in the displayed example, that the risk primarily exists at the infrastructure level and that the application level risk is minimal. As shown in FIG. 6, the larger the index, the greater the vulnerability within the infrastructure or application.

Figure 7:
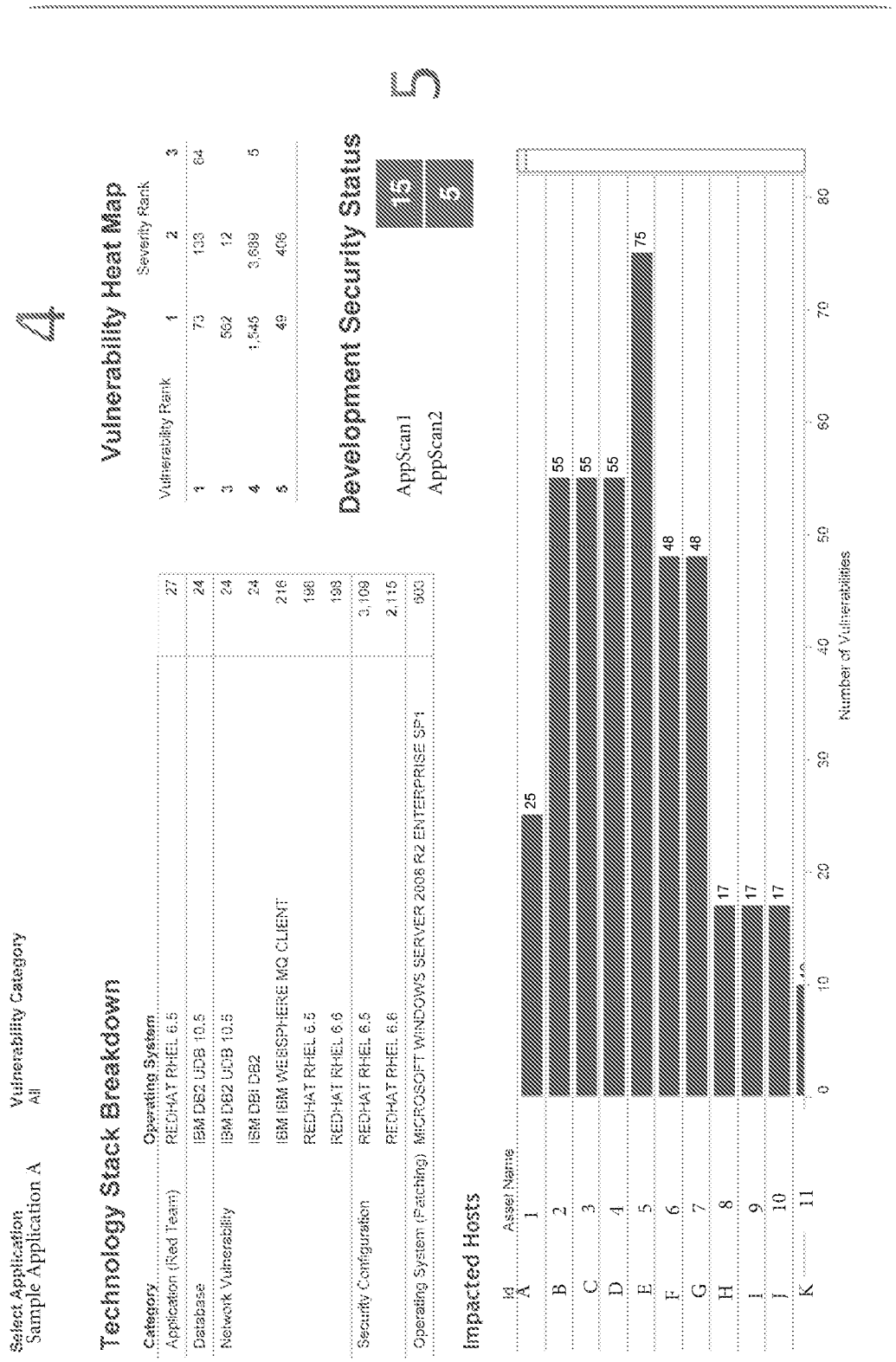
FIG. 7 is a screen shot of a user interface displaying vulnerability rankings in accordance with an embodiment of the invention.
Figure 8:
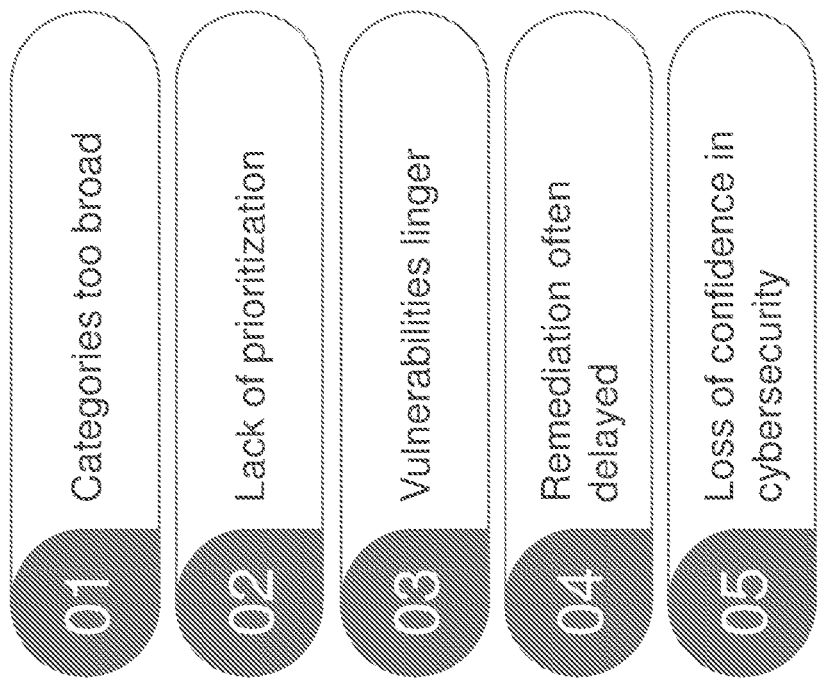
FIG. 8 illustrates deficiencies of existing systems.
Figure 8:
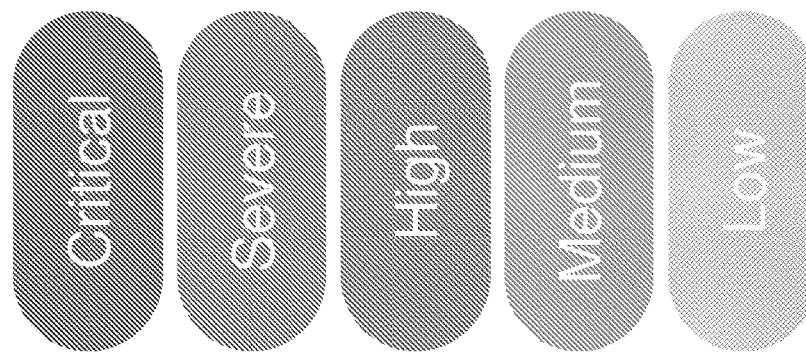

FIG. 7 is a screen shot of a user interface displaying vulnerability rankings in accordance with an embodiment of the invention. Such visualization may be generated by the prioritization implementation engine as set forth above. The application is displayed at 1. A technology stack breakdown is displayed at 2 including categories and operating systems. Impacted hosts are shown at 3 with a bar graph for displaying the comparable vulnerabilities between hosts. A vulnerability heat map is shown at 4 including vulnerability rank and severity rank. Development security status is shown at 5.

As set forth above, embodiments of the invention increase total available risk ranks in order to allow for greater differentiation and expedited prioritization in environments with extremely large numbers of network resources. Further, the system includes sufficient flexibility to allow for integration of additional risk measures, data sources, and standards as they become available. Further, the system allows for automated prioritization and remediation and enhanced visualization.

The system as illustrated in the block diagrams and flowcharts of FIGS. 1-7 include one or more computer processors capable of accessing stored data and instructions to perform various steps and may operate in conjunction with software modules described herein in order to perform various functions. Many processors may be suitable and will be further described below. All of the described engines, generators, and other components may be or include software modules that are executed by the processor to perform their stated functions. Although the software modules are shown as discrete components, they may be integrated in various ways in accordance with embodiments of the invention.

All of the components shown in the FIGs. above may be, include, or be implemented by a computer or multiple computers. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform. It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the disclosed invention.

What is claimed is:

1. A computer-implemented method for managing cybersecurity vulnerabilities of resources within at least one network, the method comprising:
    collecting, by at least one processor over a network, data pertaining to multiple network resources, the data including application risk rank and network location;
    utilizing the at least one processor to manage cybersecurity vulnerabilities within the network by performing operations including;
        determining vulnerability scores corresponding to vulnerabilities of the network resources;
        determining severity scores for the network resources based on the application risk rank and network location of the network resources;
        integrating each vulnerability score and a corresponding severity score for the network resources to create a two-dimensional risk ranking;
        calculating a vulnerability index as a weighted sum of vulnerabilities associated with an application and a host; and
        generating a user interface displaying a comparison of an infrastructure vulnerability index and an application vulnerability index.

2. The method of claim 1, further comprising scheduling remediation of vulnerabilities based on the two-dimensional risk ranking.

3. The method of claim 1, further comprising facilitating one-click generation of a prioritized remediation list based on the two-dimensional risk ranking by utilizing the user interface.

4. The method of claim 1, further comprising matching a vulnerability on the remediation list with a pre-determined patch for remediating the vulnerability.

5. The method of claim 4, further comprising automatically applying the patch to impacted network hosts.

6. The method of claim 1, wherein determining severity scores comprises determining a weight associated with a risk rank and a weight associated with a network location and summing the weights to calculate a total severity weight.

7. The method of claim 6, further comprising associating the total severity weight with a corresponding severity score.

8. The method of claim 1, further comprising displaying network hosts impacted by a selected vulnerability on to the user interface.

9. A cybersecurity vulnerability management system operating within at least one network, the system comprising:
    at least one input processing engine for collecting data including application risk rank and network location;
    at least one computer memory storing instructions;
    at least one computer processor accessing the stored instructions and the collecting data for performing steps including:
        determining vulnerability scores corresponding to vulnerabilities of network resources;

determining severity scores for the network resources based on the application risk rank and network location of the network resources;

integrating each vulnerability score and a corresponding severity score to create a two-dimensional risk ranking;

calculating a vulnerability index as a weighted sum of vulnerabilities associated with an application and a host; and generating a user interface displaying a comparison of an infrastructure vulnerability index and an application vulnerability index.

10. The system of claim 9, further comprising scheduling remediation of vulnerabilities based on the two-dimensional risk ranking.

11. The system of claim 9, wherein a prioritization implementation engine generates the user-interface facilitating one-click generation of a prioritized remediation list based on the two-dimensional risk ranking.

12. The system of claim 9, further comprising a remediation engine matching a vulnerability on the remediation list with a pre-determined patch for remediating the vulnerability.

13. The system of claim 12, wherein the remediation engine automatically applies the patch to prioritized impacted network hosts.

14. The system of claim 9, wherein a severity score calculator determines severity scores by determining a weight associated with a risk rank and a weight associated with a network location and summing the weights to calculate a total severity weight.

15. The system of claim 14, wherein the severity score calculator associates the total severity weight with a corresponding severity score.

16. A non-transitory computer-readable medium storing instructions for managing cybersecurity vulnerabilities of resources within at least one network, wherein the instructions, when executed, cause a processor to perform the following:

collecting data pertaining to multiple network resources, the data including application risk rank and network location;

determining vulnerability scores corresponding to vulnerabilities of the network resources;

determining severity scores for the network resources based on the application risk rank and network location;

integrating the vulnerability score and the severity score to create a two-dimensional risk ranking;

calculating a vulnerability index as a weighted sum of vulnerabilities associated with an application and a host; and generating a user interface displaying a comparison of an infrastructure vulnerability index and an application vulnerability index.

17. The non-transitory computer-readable medium according to claim 16, wherein the instructions, when executed, further cause the processor to perform the following: scheduling remediation of vulnerabilities based on the two-dimensional risk ranking.

18. The non-transitory computer-readable medium according to claim 16, wherein the instructions, when executed, further cause the processor to perform the following: facilitating one-click generation of a prioritized remediation list based on the two-dimensional risk ranking by utilizing the user interface.

19. The non-transitory computer-readable medium according to claim 16, wherein the instructions, when executed, further cause the processor to perform the following: matching a vulnerability on the remediation list with a pre-determined patch for remediating the vulnerability.

20. The non-transitory computer-readable medium according to claim 19, wherein the instructions, when executed, further cause the processor to perform the following: automatically applying the patch to impacted network hosts.

* * * * *